March 8, 1949. J. J. PANIK 2,464,054
PORTABLE SPOT WELDING GUN
Filed Oct. 26, 1946
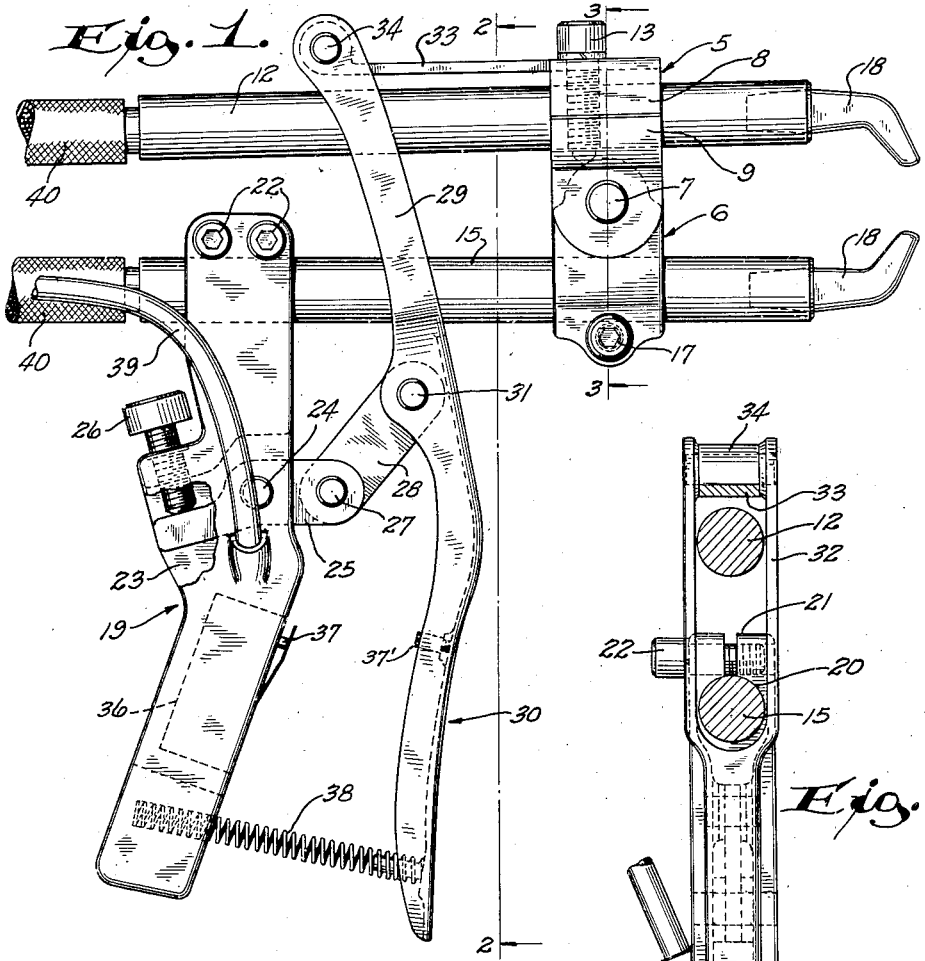
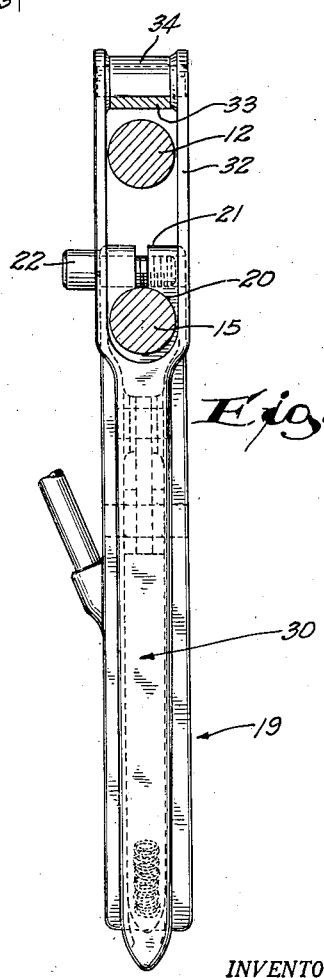
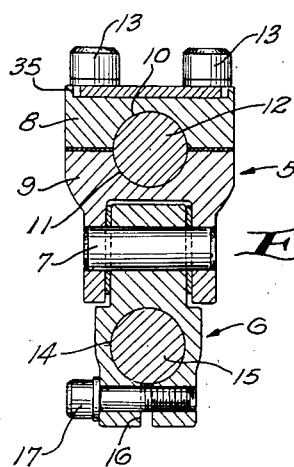
INVENTOR.
Joseph J. Panik
BY Morsell & Morsell
ATTORNEYS.

Patented Mar. 8, 1949

2,464,054

UNITED STATES PATENT OFFICE 2,464,054

PORTABLE SPOT WELDING GUN

Joseph J. Panik, Detroit, Mich., assignor to Banner Products Company, Milwaukee, Wis., a corporation of Wisconsin Application October 26, 1946, Serial No. 705,945

12 Claims. (Cl. 219—4)

This invention relates to improvements in portable spot welding guns.

It is a general object of the present invention to provide a relatively inexpensive, portable spot welding gun for use in welding operations where the more cumbersome type of welding device is not suitable.

A further object of the invention is to provide a welding gun of the class described including yielding means, preferably in the form of a leaf spring, which is interposed between the actuating mechanism and one of the movable rods for maintaining a constant pressure at the welding points.

Another object of the invention is to provide a welding gun including toggle mechanism for causing relative movement between the rods to thereby move the welding tips toward or away from one another.

A further object of the invention is to provide a welding gun as above described, wherein there is a pivoted take-up link connected to said toggle mechanism, together with means for varying the normal pivoted position of said take-up link. With this arrangement, the position of the toggle links may be altered to prevent the toggle from going past its center after wear has shortened the welding points.

A further object of the invention is to provide means responsive to movement of the actuating lever to operative position for automatically causing current to flow into the gun.

Other objects of the invention are to provide a welding gun which is relatively simple to manufacture and assemble, to provide a welding gun in which any part may be easily replaced, and to provide a welding gun which is light in weight.

With the above and other objects in view, the invention consists of the improved portable spot welding gun, and all its parts and combinations, as set forth in the claims, and all equivalents thereof.

In the accompanying drawing, illustrating one complete embodiment of the preferred form of the invention, in which the same reference numerals designate the same parts in all of the views:

Fig. 1 is a side elevational view of the improved gun, fragments of welding cable being shown connected thereto;

Fig. 2 is a sectional view taken along the line 2—2 of Fig. 1; and

Fig. 3 is a sectional view taken along the line 3—3 of Fig. 1.

Referring more particularly to the drawing, the numerals 5 and 6 designate pivot castings or rod holders which are pivoted together by means of the pin 7. The upper rod holder 5 comprises a top section 8 and a forked lower section 9, the juxtaposed faces of said sections having complementary semi-cylindrical bore portions 10 and 11 for receiving a rod 12. The rod 12 is preferably formed of cold drawn copper, and the castings 5 and 6 are preferably formed of bronze.

The lower rod holder 6 has a bore 14 for receiving a lower rod 15, and the latter is formed of the same material as the rod 12. The lower edge of the holder 6 is split as at 16, and a screw 17 is adapted to adjustably and removably clamp the rod in position in the holder.

Supported in the outer ends of the rods 12 and 15, in any well known manner, are the usual welding points 18.

A handle member 19, which may be an aluminum casting, has a transverse bore 20 near its upper end, through which the rod 15 extends. The upper end of the handle is split as at 21 and bolts 22 are utilized to adjustably and detachably clamp the handle in a selected position on the rod 15. An intermediate portion of the handle is hollow as at 23 and, pivoted therein on a pin 24, is a take-up link 25. The inner end of the link is preferably of reduced thickness and is engaged by an adjustment screw 26. The outer end of the take-up link is pivotally connected as at 27 to one end of a link 28. The link 28 forms one of the links of the toggle actuating mechanism. The other link of the toggle actuating mechanism is formed by the upper portion 29 of a lever 30, the said lever being pivotally connected as at 31 to the link 28.

The portion 29 of the lever 30 is forked as at 32 to embrace the rods 12 and 15. The extreme upper end of the lever portion 29 has one end of a leaf spring 33 pivotally connected thereto as at 34. The leaf spring extends parallel to and above the rod 12 and fits within a recess 35 in the top of the rod-holding member 5 where it is rigidly maintained in position by the bolts 13.

Concealed within the lower portion of the handle 19 is a switch box 36 having an actuating button 37 which is adapted to be engaged by a portion of the handle 37' when the handle is depressed against the tension of a coil spring 38.

From the switch box 36 suitable wires may extend through an insulated cable 39 to a timer (not illustrated). The arrangement is such that when the switch 37 is closed, current is induced to flow through welding cables 40 and into the gun.

In use of the improved spot welding gun, the handle 19 and lever 30 are gripped by one hand. When the lower portion of the lever 30 is squeezed into contact with the handle, the toggle mechanism, together with the interposed leaf spring 33, will act to apply pressure on the welding points and cause them to be moved together. Because of the use of the novel leaf spring 33 constant pressure will be applied. As the welding points 18 wear, the toggle mechanism will tend to move more and more toward a straight line position when the handle is squeezed. However, by providing the adjustable take-up link 25, the toggle may be adjusted so as to prevent the toggle links from pivoting past center during operation.

It is obvious that the spot welding gun may be made light in weight and can be easily controlled by one hand. Due to its relatively compact size it may be used in many places where non-portable welding devices are impractical. The gun is so designed that any part can be replaced quickly whenever required.

Although only one form of the invention has been shown and described, it is obvious that various changes and modifications may be made without departing from the spirit of the invention, and all of such changes are contemplated, as may come within the scope of the claims.

What I claim is:

1. In a welding gun, a pair of terminal rods having welding points, means for pivotally connecting said rods together whereby the points may be moved toward and away from each other, and actuating mechanism connected to said rods for causing said pivotal movement, the connection between one of the rods and said actuating mechanism including an elongated leaf spring.

2. In a welding gun, a pair of terminal rods having welded points, means for pivotally connecting said rods together whereby the points may be moved toward and away from each other, a handle connected to one of said terminal rods, actuating mechanism pivotally connected to said handle, and a leaf spring connecting said actuating mechanism to the other of said terminal rods.

3. In a welding gun, a pair of terminal rods having welding points, means for pivotally connecting said rods together whereby the points may be moved toward and away from each other, a handle connected to one of said terminal rods, an adjustable take-up link pivotally connected to said handle, a toggle link pivotally connected at one end to said take-up link, a lever pivotally connected intermediate its length to the other end of said toggle link, and means connecting said lever to the other of said terminal rods.

4. In a welding gun, a pair of terminal rods having welding points, means for pivotally connecting said rods together whereby the points may be moved toward and away from each other, a handle connected to one of said terminal rods, a link pivotally connected at one end to said handle, a lever pivotally connected intermediate its length to the other end of said link, and a leaf spring connecting said lever to the other of said terminal rods.

5. In a welding gun, a pair of terminal rods having welding points, means for pivotally connecting said rods together whereby the points may be moved toward and away from each other, a handle connected to one of said terminal rods, a take-up link pivotally connected to said handle, a toggle link pivotally connected at one end to said take-up link, a lever pivotally connected intermediate its length to the other end of said toggle link, means connecting said lever to the other of said terminal rods, and an adjustment member for varying the pivoted position of said take-up link.

6. In a welding gun, a pair of terminal rods having welding points at one end thereof, means intermediate the length of said rods for pivotally connecting the same together whereby the points may be moved toward and away from each other, and actuating mechanism on the opposite side of said pivotal connection from the points and resiliently connected to at least one of said rods for causing said pivotal movement, said actuating mechanism including a toggle joint.

7. In a welding gun, a pair of terminal rods having welding points at one end thereof, a holding member clamped to one of said terminal rods intermediate the length thereof, a holding member clamped to the other of said terminal rods intermediate the length thereof and pivoted to said first holding member, a handle connected to one of said terminal rods, a toggle joint pivotally connected at one end to said handle, and a leaf spring connected at one of its ends to said toggle joint, the other end of said leaf spring being rigidly connected to the holding member for the other of said terminal rods, one of the links of said toggle joint having a lever extension which is positioned for movement toward and away from said handle to move the welding points toward and away from each other.

8. In a welding gun, a pair of terminal rods having welding points at one end thereof, means for pivotally connecting said rods together whereby the points may be moved toward and away from each other, a handle connected to one of said terminal rods, a toggle joint pivotally connected at one end to said handle, resilient means connecting the other end of said toggle joint to the other of said terminal rods, said toggle joint having a lever extension which is movable toward and away from the handle, and a switch for controlling the flow of electricity to the welding points carried by the handle and positioned to be actuated by pressure of the lever extension.

9. In a welding gun, a pair of terminal rods having welding points, means for pivotally connecting said rods together whereby the points may be moved toward and away from each other, a handle connected to one of said terminal rods, a link pivotally connected at one end to said handle, a lever pivotally connected intermediate its length to the other end of said link, and a leaf spring connecting said lever to the other of said terminal rods, said leaf spring normally extending substantially parallel to said other terminal rod.

10. In a welding device, a pair of terminal rods having welding points, means for pivotally connecting said rods together whereby the points may be moved toward and away from each other, a supporting member by which one of said rods is carried, an adjustable take-up link pivotally connected to said supporting member, and actuating mechanism pivotally connected to said take-up link and to the other of said terminal rods.

11. In a welding device, a supporting member, a terminal rod carried by said supporting member and having a welding point, a second terminal rod having a welding point and movably supported in operative relationship with respect to said first terminal rod, an adjustable take-up link pivotally connected to said supporting member, and actuating mechanism pivotally connected to said take-up link and to said second rod for causing movement of said rods toward one another.

12. In a welding gun, a pair of terminal rods having welding points, means for pivotally connecting said rods together whereby the points may be moved toward and away from each other, a handle connected to one of said terminal rods and having a recess therein, a take-up link pivotally mounted in said recess, an externally accessible adjustment screw threadedly mounted in said handle and extending into said recess into engagement with an end of said take-up link, a toggle link pivotally connected at one of its ends to the opposite end of said take-up link from that engaged by the adjustment screw, a lever pivotally connected intermediate its length to the other end of said toggle link, and means connecting said lever to the other of said terminal rods.

JOSEPH J. PANIK.

REFERENCES CITED

The following references are of record in the file of this patent:

UNITED STATES PATENTS

| Number | Name | Date |
|---|---|---|
| 1,980,228 | Rogers | Nov. 13, 1934 |
| 2,179,497 | Davitow | Nov. 14, 1939 |
| 2,189,784 | Eckman | Feb. 13, 1940 |
| 2,212,154 | Eckman | Aug. 20, 1940 |
| 2,236,162 | Von Henke | Mar. 25, 1941 |
| 2,371,664 | Workman | Mar. 20, 1945 |
| 2,402,004 | Adams | June 11, 1946 |

FOREIGN PATENTS

| Number | Country | Date |
|---|---|---|
| 213,774 | Switzerland | June 3, 1941 |